United States Patent [19]

Leussink et al.

[11] 4,259,934
[45] Apr. 7, 1981

[54] APPARATUS FOR GENERATING AN IGNITION CONTROL SIGNAL FOR AN INTERNAL COMBUSTION ENGINE

[75] Inventors: Reinhard Leussink, Vaihingen; Manfred Metger, Markgröningen; Adolf Fritz, Stuttgart, Fed. Rep. of Germany

[73] Assignee: Robert Bosch GmbH, Stuttgart, Fed. Rep. of Germany

[21] Appl. No.: 81,684

[22] Filed: Oct. 4, 1979

[30] Foreign Application Priority Data

Oct. 18, 1978 [DE] Fed. Rep. of Germany ....... 2845285

[51] Int. Cl.³ ............................................. F02P 5/04
[52] U.S. Cl. .................................. 123/424; 123/416; 123/418
[58] Field of Search ....... 123/117 R, 117 D, 179 BG, 123/416, 418, 424

[56] References Cited

U.S. PATENT DOCUMENTS 4,138,976  2/1979  Crall .................................. 123/117 R

FOREIGN PATENT DOCUMENTS 2807499  8/1979  Fed. Rep. of Germany ........... 123/424

*Primary Examiner*—Ronald B. Cox
*Attorney, Agent, or Firm*—Frishauf, Holtz, Goodman & Woodward

[57] ABSTRACT

In order to prevent engine misfires and irregular engine performance when an engine is accelerated from very low speeds, for example starting speeds, due to the engagement of an automatic spark advance feature, the apparatus of the invention provides that the automatic spark advance for low and decreasing engine speeds is operative only when the engine is decelerated from higher engine speeds through an upper threshold level but remains inoperative when the engine is accelerated from low speeds through a lower threshold level. The apparatus includes a number of timing members which define a hysteresis characteristc which shifts the occurrence of an ignition control signal only when the upper speed level is crossed from above. A number of embodiments is presented.

16 Claims, 7 Drawing Figures

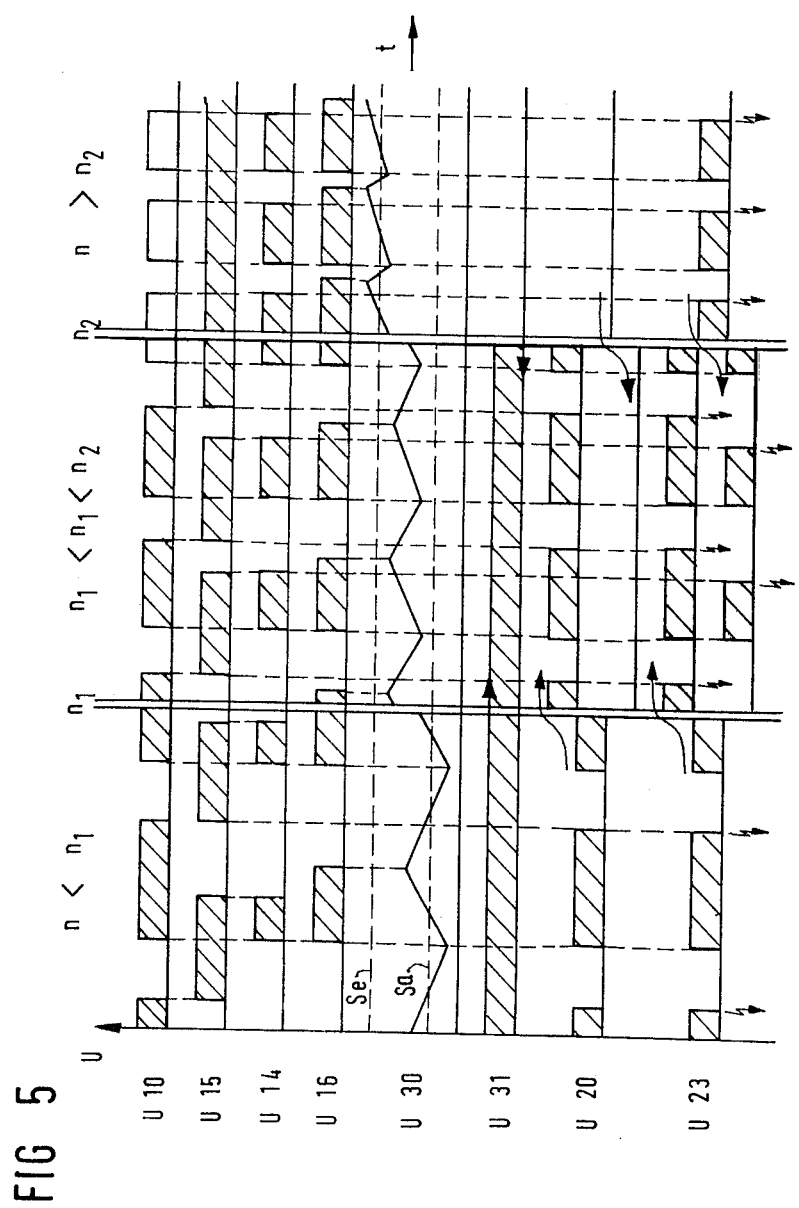

APPARATUS FOR GENERATING AN IGNITION CONTROL SIGNAL FOR AN INTERNAL COMBUSTION ENGINE

FIELD OF THE INVENTION

The invention relates generally to the control of the ignition timing in internal combustion engines. More particularly, the invention relates to the modification of the spark advance system which becomes effective in a predetermined domain of engine idling. The modification according to the invention provides for a hysteresis effect which prevents spark advance when the engine accelerates from very low speeds.

BACKGROUND OF THE INVENTION AND PRIOR ART

A known ignition timing control system which advances the spark in the lower range of the idling domain is described, for example, in the German laid-open application OS No. 2,807,499. In the system described there, any additional loads placed on the engine in the idling domain, for example by connection of electrical loads, cause the engine speed to decrease still further. Accordingly, the increasing degree of spark advance provided by the known system counteracts the rpm drop and produces an overall stabilization of the idling speed of the engine. Because the spark advance cannot be increased indefinitely, a provision is made to return the ignition timing to its original normal setting when the engine speed falls below a selectable value which preferably lies below even the lowest engine idling speed. It is a disadvantage of the know system that the spark advance also becomes effective as the engine accelerates from speeds below the lower threshold, i.e., when the engine is being started up. This sudden change in the ignition timing causes misfires and rough engine operation. Accordingly, the overall engine characteristics during starting are affected adversely.

THE INVENTION

It is thus a principal object of the present invention to provide an apparatus for modifying an existing idle spark advance system in such a way that the spark advance in the idling domain is engaged only when the engine decelerates through the upper threshold speed but does not become effective when the engine increases in speed from a very low speed beyond the lower threshold speed.

According to a desirable feature of the invention, there are provided two engine speed recognition circuits which are set for the upper and lower speed thresholds and are connected, respectively, to the set and reset inputs of a flip-flop. In another embodiment of the invention, the hysteresis of response may also be obtained by including a controllable integrator whose output is tested by a threshold switch with turn-on and turn-off thresholds set at different levels.

Other features and characteristics of the invention will emerge from the following detailed description of three exemplary embodiments of the invention with reference to the drawing.

THE DRAWING

FIG. 5 is a timing diagram to illustrate the occurrence of signals in the embodiment of FIG. 4;

DESCRIPTION OF THE PREFERRED EMBODIMENTS

Figure 1:
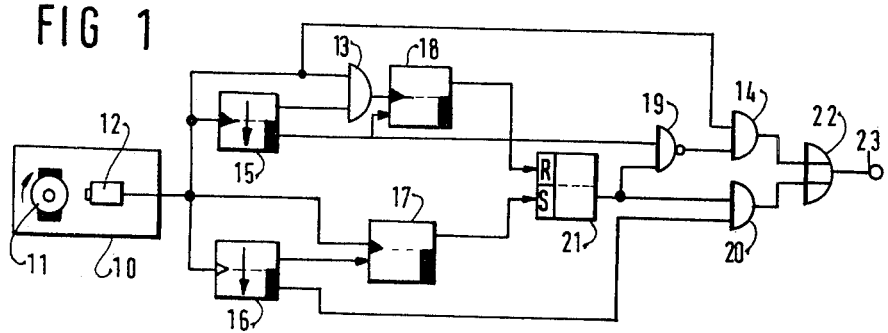
FIG. 1 is a schematic circuit diagram of a first embodiment of the invention.

The first embodiment of the invention, illustrated in FIG. 1, includes an engine speed transducer assembly 10 consisting of, for example, a rotor 11 attached to a rotating part of the engine, for example the crankshaft, and equipped with two markers, the passage of which is sensed by a detector or sensor 12. The manner of detection may be optical, inductive, magnetic, for example by Hall effect or by the Wiegand effect. The output signal is characterized by being present for a predetermined angle of crankshaft rotation. In order to produce such a persistent signal with a Wiegand detector which itself generates only very narrow pulses, a flip-flop may be employed, for example.

The output of the transducer assembly 10 is connected to one input of two AND gates 13, 14 as well as to the inputs of two timing stages, or members 15, 16 and the clock input of a flip-flop 17. One output of the timing member 15 is connected to the second input of the AND gate 13 while the complementary output of the timing member 15 is connected firstly to the input of a flip-flop 18 and secondly to the input of a NAND gate 19. The output of the AND gate 13 is connected to the clock input of the flip-flop 18. The first output of the timing member 16 is connected to the input of the flip-flop 17 whereas the second complementary output of the timing member 16 is connected to one input of an AND gate 20. The outputs of the flip-flops 17,18 which may be, for example, D-type flip-flops, are connected respectively to the set and reset inputs of an RS-flip-flop 21 whose own output is connected to an input of each of the gates 19, 20. The output of the NAND gate 19 is connected to a further input of the AND gate 14. The outputs of the AND gates 14, 20 are connected through an OR gate 22 to an output contact 23 from which a signal may be taken to engage an ignition output circuit of an engine ignition system, either directly or through suitable amplifier stages which may be part of an overall ignition angle control system. One such system is described, for example, in the German laid-open application OS No. 2,701,968 and another is described in the German laid-open application OS No. 2,655,948. An existing timing control system generates an ignition angle curve in dependence on engine characteristics and the apparatus described in the present disclosure then provides for a supplementary spark advance in the idling domain of the engine.

Figure 2:
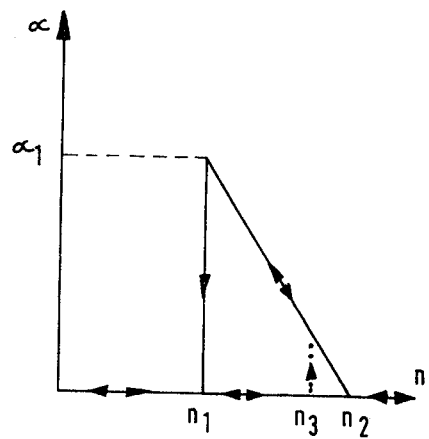
FIG. 2 is a diagram illustrating the effective spark advance angle as a function of increasing and decreasing engine speeds.

The principal function of the first embodiment of the apparatus illustrated in FIG. 1 is to respond when the engine decelerates and crosses an upper idling threshold n2 of, for example 1000 rmp, and then generates a gradually increasing signal which is related to an increasing degree of spark advance angle α. If the engine continues to slow down and the engine speed crosses a lower speed threshold n1 (for example equal to 700 rpm), the apparatus returns the ignition angle α to its original value which need not necessarily be equal to zero degree with respect to top dead center (TDC) position of a piston. The magnitude of the lower threshold speed n1 is chosen to lie below the normally occurring idling speeds of the engine. However, it is a significant feature of the present invention that, when the engine increases in speed from very low values, for example after starting, the ignition angle is not changed according to the vertical path illustrated in FIG. 2 and instead the ignition angle traverses the lower horizontal part of the curve until such time as other ignition angle control systems, which are not per se part of the present invention, change the ignition angle at higher engine speeds in a manner not shown in FIG. 2. The ignition angle adjustment provided by the present invention thus exhibits a hysteresis behavior in which the vertical part of the curve shown in FIG. 2 is traversed only in a single direction, i.e., when the engine slows down across the lower threshold n1. Accordingly, the occurrence of engine misfires during increasing engine speeds and due to an abrupt change in the spark timing is prevented.

The operation and function of the apparatus illustrated in FIG. 1 will now be described with the aid of a timing diagram of FIG. 3. The timing diagram is divided into three regions, the left region relating to engine speeds below the speed n1, the middle region being devoted to engine speeds between n1 and n2 while the right part of the diagram illustrates conditions above the speed n2. The timing member 15 is triggered by each rear edge of the transducer signal U10. The time constant of the timing member 15 is so chosen that when the engine speed exceeds the level n2, the timing member 15 is retriggered prior to the expiration of the time constant. Accordingly, the output of the element 15 is a constant logical 1 in the region above n2. The second timing member 16 is triggered by a positive-going edge of the transducer signal U10 but has the same time constant so that its output is also a constant logical 1 above the speed n2. The signal U13 derives from the AND coupling of the signals U15 and U10. The flip-flop 18 is triggered by the rear edge of the signal U13. At the time of triggering, the complementary output signal U15 is already present as a logical 1 signal at the input of the flip-flop 18. Accordingly, the flip-flop 18 generates a constant logical 1 signal until the engine speed exceeds n2 whereafter the complementary signal U15 is a logical 0. Accordingly, beginning with the engine speed n2, the output of the flop-flop 18 is a constant logical 0 and the signal U18 may thus be used to recognize the occurrence of the upper engine speed level n2. The flip-flop 17 is triggered by the rear edge of the signal U10. Below the engine speed n2, the signal U16 is shorter than the signal U10 so that the output of the flip-flop 17 is a constant logical 0. Above the engine speed n1, the signal U16 becomes longer than the signal U10 so that the flip-flop 17 generates a constant logical 1 and this signal may therefore be used to indicate the crossing of the lower threshold speed n1.

The occurrence of a 0-signal at the set input of the flip-flop 21 and a 1-signal at the reset input, causes the flip-flop 21 to be constantly reset below the engine speed n1. If the speed n1 is exceeded in the upper direction, both inputs of the flip-flop 21 are logical 1 signals and the output of the flip-flop is unchanged, i.e., the 0-signal is retained. Only when the upper threshold n2 is exceeded, does the reset signal vanish and the flip-flop 21 is set, causing its output signal to change to a logical 1. If the engine speed now again decreases below n2, both inputs of the flip-flop 21 are logical 1's but the output signal remains a logical 1 signal because the flip-flop 21 does not change its status when the input signals are identical. When the engine speed now drops below the lower threshold n1, the flip-flop 21 is reset. The hysteresis characteristic inherent in this process is then used in the subsequent gates 14, 19, 20 and 22 for generating an appropriate output signal. Below the engine speed n1, the AND gate 20 is blocked. The output of the NAND gate 19 is a constant logical 1 so that the signal U10 passes the AND gate 14 and the OR gate 22 and appears on the output contact 23. When the engine speed n1 is exceeded from below, the output signal of the flip-flop 21 is unchanged and the signal U10 continues to occur on the output contact 23. When the engine speed exceeds the level n2, the AND gate 20 is blocked because the complementary output of the timing member 16 now carries a 0-signal. The 1-signal at the output of the NAND gate 19 is also retained because the complementary output of the timing member 15 is a logical 0. Thus, the transducer signals U10 are passed directly to the output contact 23. If the engine speed now drops below the value n2, the output contact receives inverted U16 signals through the AND gate 20. The output of the NAND gate 19 receives the signal sequence U15 which is coupled in the AND gate 14 with the signal train U10. Accordingly, the output of the AND gate 14 generates a signal train corresponding to the signal train U13. By coupling this signal with the signal U16 in the OR gate 22, the resulting output signal U23 has the same temporal extent, i.e., it covers the same crankshaft angle as the signal U10 but is advanced by an angle equal to the length of the signal U16. The degree of advance varies between 0 degrees and α₁ (FIG. 2) when the engine speed varies between the speeds n1 and n2.

The second exemplary embodiment of the invention illustrated in FIG. 4 again includes an engine speed transducer assembly 10, the output of which is applied to timing members 15, 16 as well as to respective inputs of AND gates 14, 20 which correspond in function and subsequent connection to the gates 14, 20 of the embodiment in FIG. 1. The output of the timing member 15 is connected to the second input of the AND gate 14. The two complementary outputs of the timing member 16 are used, respectively, to control the upward and downward integration process of an integrating circuit 30 whose output is connected to an inverting Schmitt trigger 31 that is coupled to the second input of the AND gate 20. The output of the integrator 30 is also connected to the control input of a frequency generator 32 whose output signal is applied to the timing member 15 to control its timing characteristics.

Figure 4:
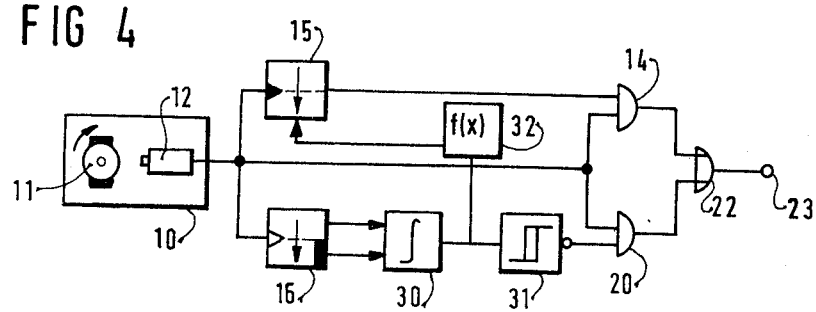
FIG. 4 is a block circuit diagram of a second embodiment of the invention.
Figure 3:
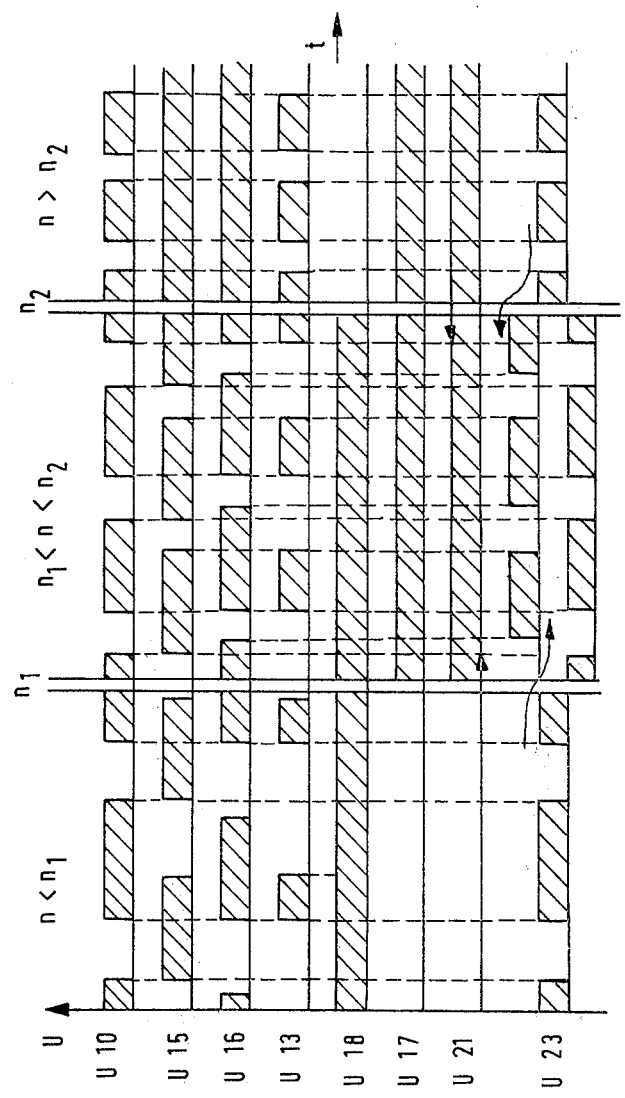
FIG. 3 is a timing diagram illustrating the sequence of signals in the apparatus of FIG. 1.

The function of the second embodiment of the invention illustrated in FIG. 4 is illustrated in the timing diagram of FIG. 5 which is subdivided in the various speed regions similarly to the diagram of FIG. 3. In the second embodiment of the invention, a rear edge of the signal U10 triggers the timing member 15 and a leading edge of the signal U10 triggers the timing member 16. The signals U10 and U15 are coupled in the AND gate 14 which produces the signal U14. The output signal U16 of the timing member 16 controls the integration process within the integrator 30, i.e., during the upper level of the signal U16, the integrator integrates in the positive direction and when the signal is absent, the integrator integrates in the negative direction. The Schmitt trigger 31 has a turn-on threshold $S_e$ and a turn-off threshold $S_a$. When the engine speeds lie below n1, the output voltage of U30 of the integrator 30 periodically exceeds the turn-off threshold $S_a$ which, due to the inverting characteristic, generates a constant 1-signal. In the speed region between the values n1 and n2, the voltage U30 varies between the values $S_e$ and $S_a$. The status of the Schmitt trigger remains unchanged i.e., if the speed region between n1 and n2 is entered from low speeds, the 1-signal at the output of the Schmitt trigger 31 is retained. If the engine speed n2 is crossed, the voltage U30 periodically crosses the turn-on threshold $S_e$, causing the Schmitt trigger 31 to switch over to a 0-signal at the output. This signal is retained when the engine speed again drops below n2. Accordingly, the circuit exhibits hysteresis.

When the engine speed drops below n1, the 1-signal at the output of the Schmitt trigger 31 causes the transducer signals U10 to be passed through the AND gate 20 and the OR gate 22 to appear at the output contact 23. The output signal train is unaffected by the signal U14. Furthermore, if the engine speed n1 is exceeded from below, the conditions remain the same because the output of the Schmitt trigger 31 remains a logical 1. When the engine speed then exceeds n2, the AND gate 20 is blocked and only the signal U14 appears at the output 23; in this engine speed domain, the signal U14 is identical to the signal U10. If the engine speed level n2 is now crossed downwardly, the AND gate 20 remains blocked and only the U14 signals go to the output 23. However, in this speed domain, the signals U14 are shorter than the signals U10 so that the rear edge of the signal is displaced in the direction of an advance by an amount varying between the value 0 degrees which occurs at n2 and $\alpha_1$ which occurs at n1 and the magnitude of $\alpha_1$ may be adjusted by adjusting the time constant of the timing member 15. This time constant may additionally be altered on the basis of engine speed due to the effect of the integrator 30 on the frequency generator 32. In the simplest case, this generator 32 produces a function which has a linear dependence to engine speed but may also generate a non-linear function in special cases. Accordingly, the ignition advance angle $\alpha$ may become a non-linear function of the decreasing engine speed n.

Figures 6, 7:
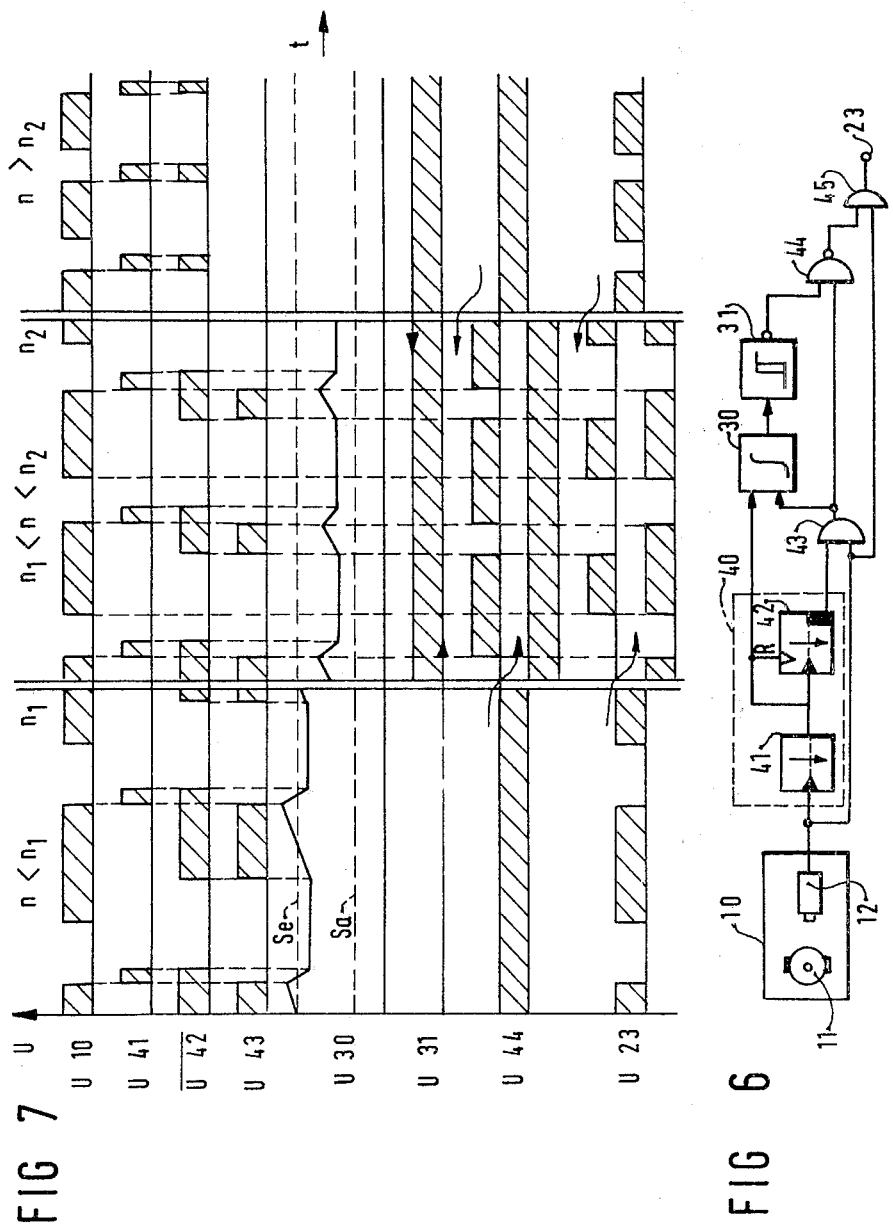
FIG. 6 is a block circuit diagram of a third embodiment of the invention.
FIG. 7 is a timing diagram illustrating the occurrence of signals in the embodiment of FIG. 6.

A third embodiment of the invention is illustrated schematically in FIG. 6. The engine speed transducer assembly 10 is connected to a timing circuit 40 consisting of two timing members 41, 42 in series. The output of the first timing member 41 is also connected to the reset input R of the second timing member 42 as well as to one input of the integrator 30. The complementary output of the second timing member 42 is connected to one input of an AND gate 43 whose output goes to the second input of the integrator 30 and to one input of a NAND gate 44. The output of the integrator 30 is connected via the inverting Schmitt trigger 31 to the second input of the NAND gate 44 whose own output is then connected through an AND gate 45 to the output contact 23. The output of the transducer assembly 10 is also connected to an input of each of the AND gates 43, 44.

The operation and function of the third embodiment of the invention illustrated in FIG. 6 will now be explained with the aid of the timing diagram of FIG. 7. The rear edge of a transducer signal U10 triggers the first timing member 41 and the rear edge of the output signal U41 triggers the second timing member 42. The timing diagram shows the complementary output signal U42 of the second timing member 42. A rising edge of the signal 41 resets the second timing member 42. If this timing member 42 is retriggerable, the resetting may be omitted. The complementary output of the timing member 42 is a constant 0-signal at engine speeds above n2. The AND gate 43 couples the complementary signal U42 with the transducer signal U10. The resulting output signal U43 controls the upward integration of the integrator 30 whereas the signal U41 initiates the downward integrating process. Accordingly, the downward integration occurs during a constant time period whereas the upward integration takes place within a period of time which is inversely and to a higher-than-proportional degree related to engine speed. In this way, the integrated voltage has a higher engine speed dependence than was the case in the embodiment of FIG. 4 which permits a more precise setting of the threshold levels in the Schmitt trigger 31. The output voltage of the Schmitt trigger 31 is derived from the integrator voltage as was the case in the embodiment of FIG. 4. However, the output voltage U31 is inverted with respect to that of the embodiment of FIG. 4 because in this case, the integration voltage decreases only for increasing engine speed. The coupling of the signal trains U31 and U43 in the NAND gate 44 generates the signal train U44 which will be a logical 1 everywhere except in the engine speed domain between n1 and n2 if the threshold speed n2 was crossed from above. The summation of the signal trains U44 and U10 in the AND gate 45 results in the output signal train U23 which is identical to the signal train U10 except in the speed region between n1 and n2 if that region was entered by crossing the upper level n2 from above. In this region, the signals U23 are shorter than the signals U10 and thus cause a shift in the signal edges and therefore a spark timing shift in the direction of advance.

The upper engine speed threshold n2 is reached when the time constant of the timing member 40 (or 15) is equal to the period of the transducer signal U10. On the other hand, the upper engine speed n2 is also defined when the integrator voltage reaches the shut-off threshold $S_a$ (turn-on threshold $S_e$ in the embodiment of FIG. 4). If these two upper engine speed thresholds n2 are different, because the integrator voltage reaches the turn-off threshold $S_a$ at an engine speed lying below n2, there occurs a shift of the response from the lower horizontal part of the curve of FIG. 2 along the dotted vertical line to the inclined part of the curve which represents the control region. In such a case, for example during engine starting and generally for increased engine speed, there occurs an abrupt spark advance at the engine speed n3 by an amount which decreases for increasing engine speed. This small amount of abrupt advance no longer causes misfires and brings the advantage that the spark advance is engaged earlier and more securely at the speed n3.

The time constant of the timing member may be altered on the basis of engine speed as was done in the embodiment of FIG. 4. However, such engine speed dependence may also be built into the timing member by the addition of elements which undergo charging or discharging in dependence on engine speed.

The overall function and construction of the various embodiments of the invention may be executed in analog or digital fashion. In the analog construction, the timing members may be, for example, monostable multivibrators and the integrator may be a capacitor with associated charging and discharging current sources. In the digital version, the timing members may be, for example, digital counters which are preset to a number that is counted down by some external fixed frequency. The integrator may be embodied as a digital up-down counter which is counted up or down by a signal train of variable frequency. The function or frequency generator 32 may be embodied digitally as a read-only-memory (ROM).

The apparatus of the invention may also be incorporated in an overall ignition system which includes, for example, ignition angle displacement, ignition closure control, etc., under the overall control of a microprocessor.

The foregoing description relates to preferred exemplary embodiments of the invention. Features of one embodiment may be used with one or more features of another embodiment and other variants are possible without departing from the spirit and scope of the invention.

We claim:

1. Apparatus to generate an ignition control signal for an internal combustion engine, said apparatus including
an engine speed transducer (10) to generate a signal related to a substantially fixed rotational angle of a piston of said engine with respect to top dead center (TDC) position thereof, said signal having leading and trailing signal flanks;
an ignition control signal generating means coupled to the transducer and responsive to a signal flank of the signal from the transducer, including
a speed responsive circuit and a timing means responsive to the occurrence of at least one of the respective signal flanks,
said ignition control signal generating means generating a speed-dependent ignition control signal as a function of the timing operation of the timing means and under continuous control of the speed signal responsive circuit to provide said ignition control signal smoothly varying as a function of speed in the direction of ignition angle advance upon decrease of rotational speed below a predetermined upper idling threshold value,
and wherein
the ignition control signal generating means includes a hysteresis circuit to affect smooth shifting of the respective signal flank in the direction of ignition angle advance, only when the speed drops from above said predetermined upper idling threshold value to below said upper value, while leaving unaffected the ignition angle when the speed rises towards said predetermined upper idle threshold value from a speed less than said predetermined upper idle threshold value.

2. Apparatus according to claim 1, wherein the ignition control signal generating means is additionally responsive to a second lower speed threshold value, less than said predetermined upper idle threshold speed value,
and, when said second lower speed value is sensed, changes the ignition angle in retarding direction,
and wherein, in accordance with the invention, the hysteresis is ineffective to affect change of the ignition angle upon rising speed from below said second lower value up to and through said predetermined upper idling threshold value,
whereby the ignition angle, as the engine comes up to speed after starting, is unaffected by ignition angle advance.

3. An apparatus according to claim 2, in which the speed responsive circuit and the timing means includes a first engine speed detection circuit (13, 14, 18) and a second engine speed detection circuit (16, 17), respectively associated with said upper and lower threshold levels, the outputs of which are connected respectively to the set input and reset input of a flip-flop (21), the output of said flip-flop (21) remaining unchanged when the output signals of said engine speed detection circuits are equal.

4. An apparatus according to claim 2, wherein (FIGS. 4, 6) the timing means includes an integrator (30) controlled by said timing means (16, 40), the output signal of the integrator is applied to the input of a threshold detection circuit (31) having two distinct response threshold levels.

5. An apparatus according to claim 4, wherein the hysteresis circuit is combined with the timing means (40) to define two time constants, the first of which defines the integration time of said integrator (30) in one direction of integration and the second of which when subtracted from the length of the signal of said engine speed transducer defines the integration time in the opposite direction of integration of said integrator (30).

6. An apparatus according to claim 1, wherein said timing means includes a timing member (15,40) which is triggered by the signal from said engine speed transducer for generating an output signal whose rear edge occurs at the expiration of the time constant of said timing member (15,40) and represents a shifted control signal for advancing the occurrence of engine ignition.

7. An apparatus according to claim 5, wherein said timing means includes a second timing member (16) (FIG. 1) for shifting the other signal edge of said engine speed transducer signal.

8. An apparatus according to claim 1, wherein said upper threshold level is defined by the equality of the time constant of said timing means (15,40) and the period of the signal from said engine speed transducer.

9. An apparatus according to claim 8, further comprising a flip-flop (18) whose input is connected to the output of said timing means (15) and having a clock input which receives a periodic clock frequency whose triggering edges occur after the expiration of the time constant of said timing means (15).

10. An apparatus according to claim 8, further comprising an AND gate (14,43) for conjoining the output signal of said timing member (15,40) and the signal from said engine speed transducer.

11. An apparatus according to claim 2, wherein said timing means includes a timing member (16) which is triggered by the first edge of the signal from said engine speed transducer and whose time constant is compared with the duration of the signal from said engine speed transducer, thereby defining the lower threshold speed level and wherein said apparatus further comprises a flip-flop (17) triggered by the second edge of the signal from said engine speed transducer, the input of said flip-flop (17) also receiving the output signal of said timing member (16).

12. An apparatus according to claim 4, wherein said lower threshold level is defined when the output signal of said integrator (30) equals the value corresponding to the lower engine speed.

13. An apparatus according to claim 12, wherein the upper engine speed threshold level is defined by the equality of the output signal of said integrator (30) and the second threshold of said threshold circuit (31), and wherein, when the engine speed exceeds said upper level in the direction of increasing engine speed, the apparatus shifts into a status in which ignition advance occurs for decreasing engine speed.

14. An apparatus according to claim 4, wherein the speed responsive means generates an rpm-dependent signal connected to change the time constant of said timing means (15).

15. An apparatus according to claim 14, wherein said rpm-dependent means receives as rpm-dependent signal the output signal of said integrator (30).

16. An apparatus according to claim 14, wherein said means for changing the time constant of said timing means (15) in rpm-dependent manner is a frequency generator (32).

* * * * *